United States Patent Office 3,658,854
Patented Apr. 25, 1972

3,658,854
3-ALKOXYMETHYLENOXY ETHERS OF ANDRO-
STANES AND 19-NORANDROSTANES AND
THEIR PREPARATION
John H. Fried, Palo Alto, Calif., assignor to Syntex
Corporation, Panama, Panama
No Drawing. Filed Apr. 16, 1969, Ser. No. 816,837
Int. Cl. C07c 169/20
U.S. Cl. 260—397.5                                14 Claims

ABSTRACT OF THE DISCLOSURE

This discloses 3-alkoxymethylenoxy ethers of the androstane and 19-norandrostane series wherein the alkoxy portion has from 1 to 4 carbon atoms, inclusive. The remainder of the androstane and 19-norandrostane steroid molecule can be optionally substituted and/or unsaturated at one or more of positions C-6, C-6,7, C-9,10, C-10, C-11,12, C-17α, C-17β, and C-18. These compounds are useful as anabolic and progestational agents. Also taught are methods useful for the preparation of these compounds.

---

The present invention relates to new and useful steroid ethers. It more specifically pertains to novel and useful 3-alkoxymethylenoxy steroids of the androstane and 19-nor-androstane series, including various molecularly modified derivatives thereof, the streoid nucleus thus bearing at the C-3 position a novel group represented by the following Formula A:

ROCH₂O—                                (A)

wherein R is an alkyl group containing from 1 to 4 carbon atoms,inclusive.

The novel 3-alkoxymethylenoxy ethers in the androstane and 19-norandrostane series of the present invention are represented by the following Formulas I, and II:

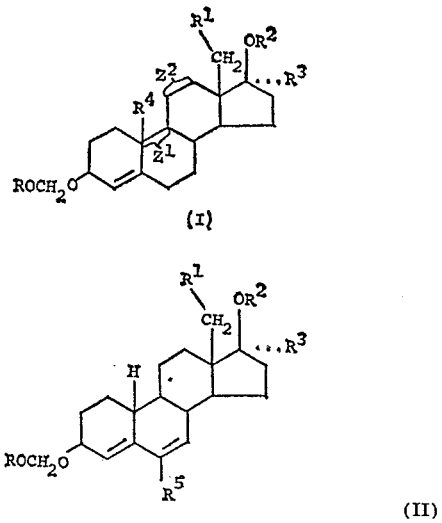

In Formulas I and II and succeeding formulas,

R is an alkyl group containing from 1 to 4 carbon atoms, inclusive;

$R^1$ is hyrogen or an alkyl group containing from 1 to 3 carbon atoms, inclusive;

$R^2$ is hydrogen, tetrahydrofuran-2-yl, tetrahydropyran-2-yl, cyclopentyl, or a carboxylic acyl group of less than 12 carbon atoms;

$R^3$ is hydrogen, methyl, ethyl, vinyl, propadienyl, or ethynyl;

$R^4$ is hydrogen or methyl;

$R^5$ is hydrogen, chloro, fluoro or methyl; and

Each of $Z^1$ and $Z^2$ is a carbon-carbon single bond or a carbon-carbon double bond, $Z^1$ being a carbon-carbon double bond when $Z^2$ is a carbon-carbon double bond, $R^4$ being non-existent when $Z^1$ is a carbon-carbon double bond.

In the present specification and claims, the expression "alkyl" denotes saturated aliphatic hydrocarbon radicals containing the indicated number of carbon atoms and including all isomeric forms such as methyl, ethyl, n-propyl, isopropyl, n-butyl, isobutyl, sec-butyl, and t-butyl. The term "carboxylic acid acyl" defines an acyl group which is derived from a substituted or unsubstituted carboxylic acid. These acids can be completely saturated or they can possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like. Typical carboxylic acid esters under these definitions thus include acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-buylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitrobenzoate, aminoacetate, diethylaminoacetate, piperidinoacetate, β-chloropropionate, trichloroacetate, bicyclo[2.2.2]octane-1′-carboxylate, 4-methylbicyclo[2.2.2]oct-2′-en-1′ - carboxylate, and the like.

The compounds of the present invention, as depicted by Formulas I and II above wherein $R^3$ is hydrogen, methyl or ethyl, are anabolic agents with a favorable anabolic: androgenic ratio. Those compounds of the present invention as depicted by Formulas I and II wherein $R^3$ is vinyl, propadienyl or ethynyl are progestational agents. Thus, the compounds of the first category are accordingly useful in the treatment of debilitating conditions associated with old age, post-operative recuperation, and the like. Those compounds of the second category are accordingly useful in fertility control, in the treatment of premenstrual tension, and in lowering blood cholesterol levels. In accordance with these utilities, the compounds of the present invention are employed in the same manner as compounds having similar properties, such as 17α-ethyl-19-nortestosterone, testosterone propionate, 17α-methyl-19-nortestosterone, and progesterone, chlormadinone acetate, and so forth. These compounds can be administered via the usual routes, whether orally or parenterally, either singly, in conjunction with other medicinal agents, or in pharmaceutically acceptable non-toxic compositions formed by the incorporation of any of the normally employed excipients.

The compounds of the present invention are prepared by reacting together a 3β-hydroxy steroid, otherwise corresponding to the compounds depicted by Formulas I and II above, and a chloromethyl alkyl ether, wherein the alkyl group contains from one to four carbon atoms, and a tertiary amine. This reaction is further conducted at temperatures ranging from about 50° C. up to and preferably at the boiling point of the reaction mixture and under reflux and for a period of time sufficient to complete the reaction. The choice of chloromethyl allkyl ether is made depending upon the final product desired, as depicted by group R. Suitable tertiary amines include the trialkyl amines, such as triethylamine, tributylamine, and so forth, and the cyclic amines, such as pyridine, collidine, lutidine, and so forth and generally, those which have a boiling point of at least about 60° C.

The reaction is optionally performed under an atmosphere which is inert to the reactant, such as argon and nitrogen. Also, the reaction can optionally be performed under anhydrous or substantially anhydrous conditions. However, while these conditions may under the most favorable circumstances be preferred, they are not an absolute necessity for the practice of the present invention.

In carrying out this reaction, the 3β-hydroxy starting steroid, chloromethyl alkyl ether, and tertiary amine, are mixed and maintained together in any convenient order or fashion. The reaction mixture is then maintained within the given temperature range for a period of time sufficient to complete the reaction. Upon the completion of the reaction, the reaction mixture is processed via conventional procedures, such as chromatography, decantation, filtration, distillation, evaporation, and so forth, to recover and isolate the desired product.

The given reaction consumes the respective reactants in the ratio of mole of 3β-hydroxy starting steroid per mole of chloromethyl alkylether per mole of tertiary amine. However, the amounts of the reactants to be employed are not critical, some of the desired product being obtained when employing any proportions thereof. In the preferred embodiments hereof, the tertiary amine is employed in amounts sufficient so as to be useful also as a liquid reaction medium or solvent for the reaction. The chloromethyl alkyl ether is preferably employed in amounts ranging from three to fifty moles per mole of starting 3β-hydroxy starting steroid or in amounts sufficient so as to be useful also as a co-solvent for the reaction.

The starting 3β-hydroxy compounds of the present invention are known or can be prepared in accordance with the procedures which are known and standard in the art. The 17α,17β-elaborative groupings commonly result from a 17-oxo compound. All of these procedures, such as the formation of a 17β-ether or ester grouping and the formation of a 17α-aliphatic grouping, are well known in the steroid art and have been frequently documented. Similarly, the 4,9,(10)-diene or a 4,9(10),11-triene system is introduced in accordance with methods which are known in the steroid art. The C-6 substituents are present in the starting material although these groupings can similarly be introduced into a 3-keto-Δ⁴,⁶-diene compound in accordance with known procedures. Thus, the 3-keto-Δ⁴-ene can be converted to its respective enol ether with ethylorthoformate and this enol ether then treated with n-chlorosuccinimide or perchloryl fluoride to respectively prepare the 6-chloro and 6-fluoro derivatives. The double bond is then regenerated by treating the 3-keto-6-substituted-Δ⁴ derivatives with chloranil to give the corresponding Δ⁴,⁶-diene directly or by first forming the enol ether of the 6-substituted compound and treating this with 2,3-dichloro-5,6-dicyanobenzoquinone in the presence of p-toluenesulfonic acid as an alternative method to provide the Δ⁴,⁶-diene compound.

Alternatively, the 3β-hydroxy starting compounds can be prepared from the corresponding 3-oxo derivatives which may be more readily available. In this procedure, the 3-oxo group can be reduced such as with sodium borohydride in methanol or dioxane or with lithium aluminum hydride in tetrahydrofuran or with lithium aluminum t-butoxide in tetrahydrofuran. Representative starting compounds and/or processes for their preparation can be found in one or more of U.S. Pats. 3,101,355; 3,136,790; 3,248,294; 3,250,792; and 3,257,278.

Representative starting compounds include the following:

18-isopropylandrost-4-ene-3β,17β-diol,
18-isopropylestra-4,9(10)-diene-3β,17β-diol,
17α,18-dimethyl-17β-cyclopentyloxyestra-4,9(10),11-trien-3β-ol,
17α-methyl-18-ethylestr-4-ene-3β,17β-diol,
17α,18-dimethyl-17β-acetoxyandrost-4-en-3β-ol,
17β-heptanoyloxyestra-4,9(10),11-trien-3β-ol,
6-chloro-17β-caproyloxy-18-ethylestra-4,6-dien-3β-ol,
17α-propadienyl-17β-propionyloxy-18-n-propylestra-4,6-dien-3β-ol,
6-chloro-17α-vinyl-18-methylestra-4,6-diene-3β,17β-diol, and
6-fluoro-17-acetoxyestra-4,6-dien-3β-ol.

The chloromethyl alkyl ether reactants are known compounds and can be prepared in accordance with known methods, vide Wagner and Zook, Synthetic Organic Chemistry, John Wiley and Sons, Inc., New York, 1953 (1963), especially pages 99 and 100 and 226 et seq.

The following examples serve to further typify the manner by which the present invention can be practiced but, as such, should not be construed as limitations upon the overall scope hereof.

EXAMPLE 1

A solution of 2 g. of 17α-ethynyl-17β-acetoxyandrost-4-en-3-one in 20 ml. of anhydrous tetrahydrofuran is cooled to −75° C. in a Dry Ice-acetone bath and treated with a previously cooled solution of 0.6 g. of lithium aluminum t-butoxide in 20 ml. of anhydrous tetrahydrofuran. After maintaining the reaction mixture at reflux for 15 minutes it is cooled and poured into ice water and extracted several times with ethyl acetate. These extracts are washed with water to neutrality, dried over anhydrous sodium sulfate and evaporated to dryness to yield 17α-ethynyl-17β-acetoxyandrost-4-en-3β-ol.

In like manner, the other 3β-hydroxy compounds, useful as starting materials as herein described, are prepared from the corresponding known 3-oxo derivatives.

EXAMPLE 2

A steroidal solution is prepared by dispersing 1 g. of 17α-ethynyl-17β-acetoxyandrost-4-en-3β-ol in 50 ml. of anhydrous collidine at room temperature. To the resulting solution are added 5 ml. of chloromethyl methyl ether portionwise with stirring and at 5° C. under a nitrogen atmosphere. Following the addition, the temperature of the resulting mixture is raised to its boiling point and maintained under reflux for a period of ten hours. After this time, the reaction mixture is poured into water and the aqueous mixture extracted with ethyl acetate. The ethyl acetate extracts are washed with water and then dried over sodium sulfate. The dried extracts are evaporated to dryness and the residue chromatographed on alumina to obtain the 3β-methoxymethylenoxy-17α-ethynyl-17β-acetoxyandrost-4-ene product.

EXAMPLE 3

A solution of 10 g. of 17α-ethynyl-17β-acetoxyestra-4,9(10),11-trien-3β-ol dispersed in 150 ml. of anhydrous pyridine is prepared. To this solution is added 20 ml. of chloromethyl ethyl ether. This addition is conducted in a portionwise manner while maintaining the entire mixture at 5° C. and under a nitrogen atmosphere. The resulting reaction mixture is heated to the boiling point and maintained at reflux temperature, under a nitrogen atmosphere, for 18 hours. After this time, the reaction mixture is poured into water and the aqueous mixture extracted with ethyl acetate. The ethyl acetate extracts, after washing them with water, are dried over anhydrous sodium sulfate and evaporated to dryness. The residue is chromatographed on alumina to provide the 3β-ethoxymethylenoxy-17α-ethynyl - 17β - acetoxyestra-4,9(10),11-triene product.

EXAMPLE 4

One gram of 17α-ethyl-17β-acetoxy-18-methylestra-4,6-dien-3β-ol is dispersed in 10 ml. of triethylamine at room temperature. To the resulting solution is added 5 g. of chloromethyl n-propyl ether in a portionwise fashion with stirring. The reaction mixture is then heated to the boiling point and maintained under reflux for a period of 15 hours. After this time, the reaction mixture is poured into water and the aqueous mixture extracted with several portions of ethyl acetate. The ethyl acetate extracts are washed well with water and then evaporated to dryness. The residue obtained after evaporation is chromatographed on alumina to obtain the 3β-n-propoxymethylenoxy-17α-ethyl-17β-acetoxy-18-methylestra - 4,6-diene product.

EXAMPLE 5

The procedure set forth in Example 2 is repeated utilizing 6 - chloro-17α-methylestra-4,6-diene-3β,17β-diol, chloromethyl isobutyl ether, and lutidine to obtain the 3β-isobutoxymethylenoxy - 6 - chloro-17α-methylestra-4,6-dien-17β-ol product.

EXAMPLE 6

The procedure set forth in Example 3 is repeated utilizing 17α-propadienyl-18-ethylestra - 4,9(10) - diene-3β,17β-diol and chloromethyl methyl ether to obtain the 3β-methoxymethylenoxy-17α-propadienyl - 18 - ethylestra-4,9(10)-dien-17β-ol product.

EXAMPLE 7

To a solution of 10 g. of 17α-ethynylestr-4-ene-3β,17β-diol in 150 ml. of pyridine are added 30 ml. of chloromethyl methyl ether at 0° C. under a nitrogen atmosphere. The reaction mixture is then heated at 70° C. for 12 hours. After this time, it is poured into ice water and extracted with methylene chloride. The methylene chloride extracts are washed with water, dried over anhydrous sodium sulfate and evaporated to dryness. The residual oil is chromatographed on washed alumina, eluting with hexane:methylene chloride (1:1) to obtain the 3β-methoxymethylenoxy - 17α - ethynylestr-4-en-17β-ol product.

In accordance with the foregoing methods, the following are carried out.

By reacting together 17α-ethynyl-18-methylestr-4-ene-3β,17β-diol and chloromethyl methyl ether, there is obtained the 3β-methoxymethylenoxy-17α-ethynyl-18-methylestr-4-en-17β-ol product.

By reacting together 17α-ethynyl - 17β - acetoxy-18-methyl estr-4-ene and chloromethyl methyl ether, there is obtained the 3β-methoxymethylenoxy-17α-ethynyl-17β-acetoxy-18-methylestr-4-ene product.

By reacting together 17α-ethynylestr-4-ene-3β,17β-diol and chloromethyl ethyl ether, there is obtained the 3β-ethoxymethylenoxy-17α-ethynylestr-4-en-17β-ol product.

By reacting together 17α-propadienyl-18-methylestr-4-ene-3β,17β-diol and chloromethyl n-propyl ether, there is obtained the 3β-(n-propoxymethyleneoxy)-17α-propadienyl-18-methylestr-4-en-17β-ol product.

By reacting together 17α-propadienylestr-4-ene-3β,17β-diol and chloromethyl methyl ether, there is obtained the 3β-methoxymethylenoxy-17α-propadienylestr - 4 - en-17β-ol product.

By reacting together 17α-propadienyl-17β-acetoxyestr-4-en-3β-ol and chloromethyl methyl ether, there is obtained the 3β-methoxymethylenoxy-17α-propadienyl-17β-acetoxyestr-4-ene product.

By reacting together 17α-propadienyl-18-methylestr-4-ene-3β,17β-diol and chloromethyl methyl ether, there is obtained the 3β-methoxymethylenoxy-17α-propadienyl-18-methylestr-4-en-17β-ol product.

By reacting together 17α-propadienyl-17β-acetoxy-18-methylestr-4-en-3β-ol and chloromethyl isopropyl ether there is obtained the 3β-isopropoxymethylenoxy-17α-propadienyl-17β-acetoxy-18-methylestr-4-ene product.

By reacting together 17α-ethynyl-17β-cyclopentyloxy-18 - methylestr - 4,9(10),11 - trien - 3β - ol and chloromethyl n-butyl ether there is obtained the 3β-(n-butoxymethylenoxy) - 17α-ethynyl-17β-cyclopentyloxy-18-methylestr-4,9(10),11-triene product.

By reacting together 17α-ethynylestra-4,9(10),11-triene-3β,17β-diol and chloromethyl methyl ether there is obtained the 3β-methoxymethylenoxy - 17α-ethynylestra-4,9(10),11-trien-17β-ol product.

By reacting together 17α-ethynyl-17β-acetoxyestra-4,9(10),11-trien-3β-ol and chloromethyl methyl ether there is obtained the 3β-methoxymethylenoxy-17α-ethynyl-17β-acetoxyestra-4,9(10),11-triene product.

By reacting together 17α-ethynyl-18-methylestra-4,9(10),11-triene-3β,17β-diol and chloromethyl methyl ether there is obtained the 3-methoxymethylenoxy-17α-ethynyl-18-methylestra-4,9(10),11-trien-17β-ol product.

By reacting together 17α-ethynyl-17β-acetoxy-18-methylestra-4,9(10),11-trien-3β-ol and chloromethyl ethyl ether there is obtained the 3β-ethoxymethylenoxy-17α-ethynyl-17β-acetoxy-18-methylestr-4,9(10),11-triene product.

By reacting together 17α-ethyl-18-methylestr-4-ene-3β,17β-diol and chloromethyl sec-butyl ether there is obtained the 3β-(sec-butoxy methylenoxy)-17α-ethyl-18-methylestr-4-ene-17β-ol product.

By reacting together 17α-ethylestr-4-ene-3β,17β-diol and chloromethyl methyl ether there is obtained the 3β-methoxy-methylenoxy-17α-ethylestr-4-en-17β-ol product.

By reacting 17α-ethyl-17β-acetoxyestr-4-en-3β-ol and chloromethyl methyl ether there is obtained the 3β-methoxy-methylenoxy-17α-ethyl-17β-acetoxyestr-4-ene product.

By reacting together 17α-ethyl-17β-acetoxy-18-methylestr-4-en-3β-ol and chloromethyl methyl ether there is obtained the 3β-methoxymethylenoxy-17α-ethyl-17β-acetoxy-18-methylestr-4-ene product.

By reacting together 17α-ethyl-17β-tetrahydropyran-2-yloxyestr-4-en-3β-ol and chloromethyl t-butyl ether there is obtained the 3β-(t-butoxymethylenoxy)-17α-ethyl-17β-tetrahydropyran-2-yloxyestr-4-ene product.

By reacting together 17α-ethynyl-17β-tetrahydrofuran-2-yloxyestra-4,6-dien-3β-ol and chloromethyl methyl ether there is obtained the 3β-methoxymethylenoxy-17α-ethynyl-17β-tetrahydrofuran-2-yloxyestra-4,6-diene product.

By reacting together 6-chloro-17α-ethynylestr-4,6-diene-3β,17β-diol and chloromethyl n-propyl ether there is obtained the 3β-(n-propoxymethylenoxy)-6-chloro-17α-ethynylestra-4,6-diene-17β-ol product.

By reacting together 17α-ethynyl-18-methylestr-4,6-diene-3β,17β-diol and chloromethyl t-butyl ether there is obtained the 3β-(t-butoxymethylenoxy)-17α-ethynyl-18-methylestra-4,6-dien-17β-ol product.

By reacting together 6-chloro-17α-ethynylestra-4,6-diene-3β,17β-diol and chloromethyl methyl ether there is obtained the 3β-methoxymethylenoxy-6-chloro-17α-ethynylestra-4,6-dien-17β-ol product.

By reacting together 6-chloro-17α-ethynyl-17β-acetoxyestra-4,6-diene and chloromethyl methyl ether there is obtained the 3β-methoxymethylenoxy-6-chloro-17α-ethynyl-17β-acetoxyestra-4,6-diene product.

By reacting together 6-chloro-17α-ethynyl-18-methylestra-4,6-diene-3β,17β-diol and chloromethyl methyl ether there is obtained the 3β-methoxymethylenoxy-6-chloro-17α-ethynyl-18-methylestra-4,6-dien-17β-ol product.

By reacting together 6-fluoro-17α-ethynylestra-4,6-diene-3β,17β-diol and chloromethyl methyl ether there is obtained the 3β-methoxymethylenoxy-6-fluoro-17α-ethynylestra-4,6-dien-17β-ol product.

By reacting together 6-fluoro-17α-ethynyl-17β-acetoxy-estra-4,6-diene and chloromethyl methyl ether there is obtained the 3β-methoxymethylenoxy-6-fluoro-17α-ethynyl-17β-acetoxyestra-4,6-diene product.

By reacting together 6-fluoro-17α-ethynyl-17β-acetoxy-18-methylestra-4,6-diene-3β,17β-diol and chloromethyl methyl ether there is obtained the 3β-methoxymethylenoxy - 6 - fluoro-17α-ethynyl-17β-acetoxy-18-methylestra-4,6-diene product.

By reacting together 6-fluoro-17α-ethynylestra-4,6-dien-3β-ol and chloromethyl methyl ether there is obtained the 3β-methoxymethylenoxy-6-fluoro-17α-ethynylestra-4,6-diene product.

By reacting together 6-methyl-17α-ethynylestra-4,6-diene-3β,17β-diol and chloromethyl isopropyl ether there is obtained the 3β-isopropoxymethylenoxy-6-methyl-17α-ethynylestra-4,6-dien-17β-ol product.

By reacting together 17α-ethynyl-17β-acetoxyestra-4,6-diene-3β-ol and chloromethyl ethyl ether there is obtained the 3β-ethoxymethylenoxy-17α-ethynyl-17β-acetoxyestra-4,6-diene product.

By reacting together 17α-ethynyl-18-methylestra-4,6-diene-3β,17β-diol and chloromethyl methyl ether there is obtained the 3β-methoxymethylenoxy-17α-ethynyl-18-methylestra-4,6-dien-17β-ol product.

By reacting together 17α-ethynylestra-4,6-diene-3β,17β-diol and chloromethyl methyl ether there is obtained the 3β - methoxymethylenoxy-17α-ethynylestra-4,6-dien-17β-ol product.

By reacting together 17α-vinyl-17β-propionyloxy-18-ethylandrost-4-en-3β-ol and chloromethyl and ethyl ether there is obtained the 3β-ethoxymethylenoxy-17α-vinyl-17β-propionyloxy-18-ethylandrost-4-ene product.

By reacting together 18-n-propylandrost-4-ene-3β,17β-diol and chloromethyl methyl ether there is obtained the 3β - methoxymethylenoxy-18-n-propylandrost-4-en-17β-ol product.

By reacting together 17α-ethynylandrost-4-ene-3β,17β-diol and chloromethyl methyl ether there is obtained the 3β - methoxymethylenoxy - 17α-ethynylandrost-4-en-17β-ol product.

By reacting together 17α-propadienyl-17β-tetrahydrofuran-2-yloxyestra - 4,9(10)-dien-3β-ol and chloromethyl ethyl ether there is obtained the 3β-ethoxymethylenoxy-17α-propadienyl-17β-tetrahydrofuran - 2 - yloxyestra - 4,9 (10)-diene product.

By reacting together 17α-vinyl - 18 - methylester-4,9 (10),11-triene - 3β,17β - diol and chloromethyl n - propyl ether there is obtained the 3β-n-propoxymethylenoxy-17α-vinyl-18-methylestra-4,9(10),11-trien-17β-ol product.

By reacting together 17α-vinyl-17β-propionyloxy-18-ethylandrost-4-en-3β-ol and chloromethyl isopropyl ether there is obtained the 3β - isopropoxymethylenoxy - 17α-vinyl-17β-propionyloxy-18-ethylandrost-4-ene product.

By reacting together 6-chloro-17α-vinyl-17β-tetrahydropyran-2-yloxy-18-ethylestra-4,6-dien - 3β - ol and chloromethyl n-butyl ether there is obtained the 3β-n-butoxymethylenoxy-6-chloro - 17α - vinyl - 17β - tetrahydropyran-2-yloxy-18-ethylestra-4,6-diene product.

By reacting together 6 - methyl-17β-acetoxyestra-4,6-dien - 3β - ol and chloromethyl sec-butyl ether there is obtained the 3β - sec - butoxymethylenoxy - 6 methyl 17β-acetoxyestra-4,6-diene product.

By reacting together estra-4,6-diene-3β,17β-diol and chloromethyl isobutyl ether there is obtained the 3β-isobutoxymethylenoxyestra-4,6-dien-17β-ol product.

By reacting together 6-chloroestra-4,6-diene-3β,17β-diol and chloromethyl t-butyl ether there is obtained the 3β - t - butoxymethylenoxy - 6 - chloroestra - 4,6-dien-17β-ol product.

What is claimed is:
1. The compound represented by one of the following Formulas I, II and III:

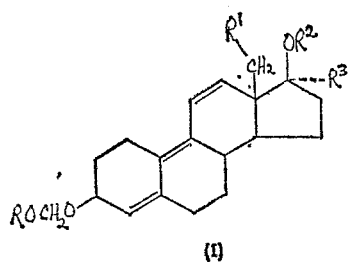

(I)

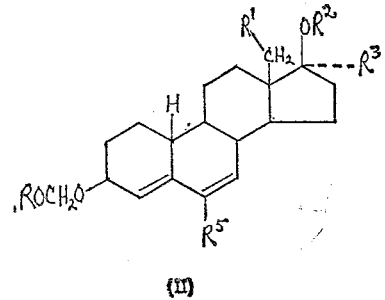

(II)

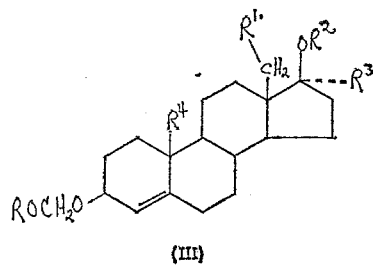

(III)

wherein,

R is an alkyl group containing from 1 to 4 carbon atoms, inclusive;

R¹ is hydrogen or an alkyl group containing from 1 to 3 carbon atoms, inclusive;

R² is hydrogen, tetrahydrofuran-2-yl, tetrahydropyran-2-yl, cyclopentyl, or a hydrocarbon carboxylic acyl group of less than 12 carbon atoms;

R³ is hydrogen, methyl, ethyl, vinyl, propadienyl or ethynyl;

R⁴ is hydrogen or methyl, with the proviso that when R⁴ is hydrogen, R³ is propadienyl;

R⁵ is hydrogen, chloro, fluoro or methyl.

2. The compound claimed in claim 1 wherein R is methyl or ethyl.

3. The compound claimed in claim 1 wherein R¹ is hydrogen or methyl, R² is hydrogen or a carboxylic acyl group of less than 12 carbon atoms.

4. The compound of Formula I of claim 1 wherein R is methyl, R¹ is hydrogen, R² is hydrogen, R³ is ethynyl and the 17β-acetate and 18-methyl derivatives thereof.

5. The compound of Formula III of claim 1 wherein R is methyl, R¹ is hydrogen, R² is hydrogen, R³ is propadienyl, R⁴ is hydrogen, and the 17β-acetate and 18-methyl derivatives thereof.

6. The compound of Formula III of claim 1 wherein R is methyl, R¹ is hydrogen, R² is hydrogen, R³ is ethynyl, and the 17β-acetate and 18-methyl derivatives thereof.

7. The compound of Formula III of claim 1 wherein R is methyl, R¹ is hydrogen, R² is hydrogen, R³ is ethyl and the 17β-acetate and 18-methyl derivatives thereof.

8. The compound of Formula II of claim 1 wherein R is methyl, R¹ is hydrogen, R² is hydrogen, R³ is ethynyl, and R⁵ is hydrogen and the 17β-acetate and 18-methyl derivatives thereof.

9. The compound of Formula II of claim 1 wherein R is methyl, R¹ is hydrogen, R² is hydrogen, R³ ethynyl, and R⁵ is chloro and the 17β-acetate and 18-methyl derivatives thereof.

10. The compound of Formula II of claim 1 wherein R is methyl, R¹ is hydrogen, R² is hydrogen, R³ is ethynyl, and R⁵ is fluoro and the 17β-acetate and 18-methyl derivatives thereof.

11. The compound of one of the formulas:

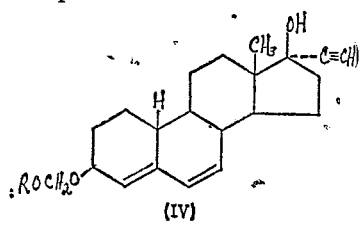

(IV)

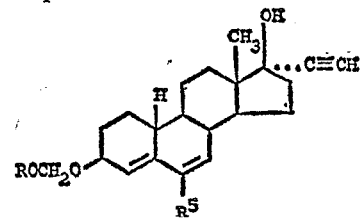

(V)

wherein R is an alkyl group containing from 1 to 4 carbon atoms, inclusive, and the 17β-acetate derivatives thereof.

12. The compound of the formula:

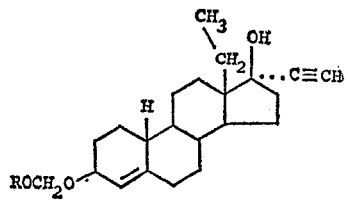

wherein, R is an alkyl group containing from 1 to 4 carbon atoms, inclusive, and $R^5$ is chloro or fluoro, and the 17β-acetate derivatives thereof.

13. The compound of the formula:

wherein R is an alkyl group containing from 1 to 4 carbon atoms, inclusive, and the 17β-acetate derivative thereof.

14. The compound claimed in claim 13 wherein R is methyl and the 17β-acetate derivative thereof.

References Cited

UNITED STATES PATENTS 3,068,249   12/1962   Colton et al. _____ 260—397.5
3,301,879   1/1967   Wettstein et al. ____ 260—397.5

HENRY A. FRENCH, Primary Examiner

U.S. Cl. X.R.
260—235.55, 999